Sept. 7, 1926.

S. O. WHITE

AUTOMOBILE BRAKE

Filed August 4, 1923

INVENTOR
Samuel O. White,
BY
Arthur M. Hood,
ATTORNEY

Sept. 7, 1926.

S. O. WHITE

AUTOMOBILE BRAKE

Filed August 4, 1923

INVENTOR
Samuel O. White,
BY
Arthur M. Hood.
ATTORNEY

Patented Sept. 7, 1926.

1,599,191

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

AUTOMOBILE BRAKE.

Application filed August 4, 1923. Serial No. 655,553.

My invention relates to improvement in brakes for automobiles and is particularly adapted for hand operated brakes for automobiles, which are arranged to be mounted in proximity to and supported by the transmission case of the automobile and operate upon a drum mounted on the drive shaft.

One of the objects of my invention is to provide a brake which may be cheaply manufactured, the parts of which are reduced to a minimum, which may be readily assembled and which will not be rendered inoperative by accumulation of dirt and rust and by neglect.

For the purpose of disclosing my invention, I have illustrated one embodiment thereof in the accompanying drawing in which—

Figure 1:
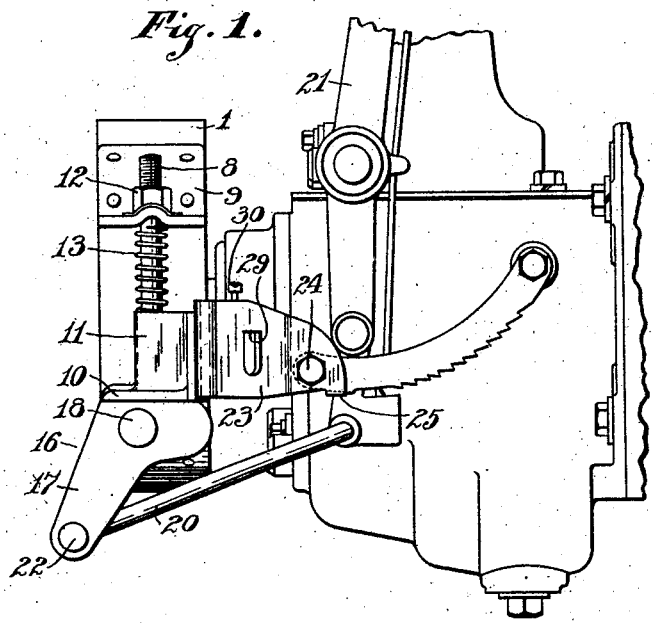
Fig. 1 is a side elevation of an automobile transmission case showing my brake attached.
Figure 2:
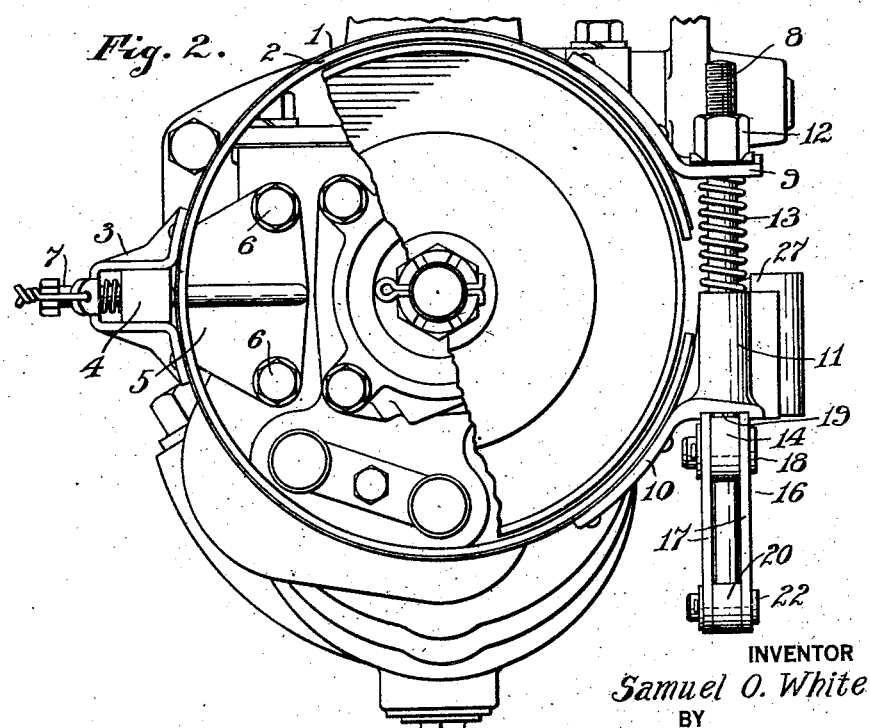
Fig. 2 is a rear elevation thereof showing particularly the brake and its mounting.
Figure 3:
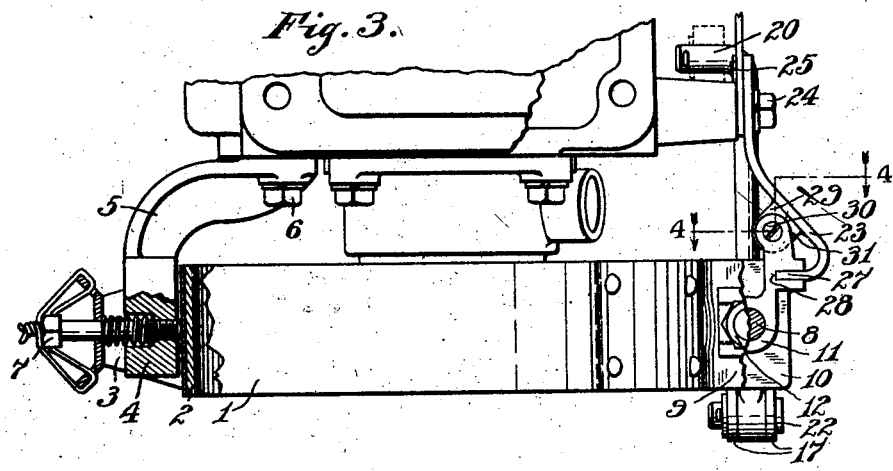
Fig. 3 is a plan view partly in section;
Figure 4:
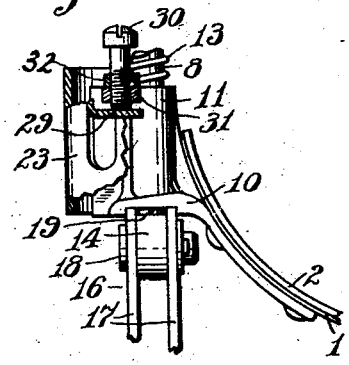
Fig. 4 is a detail section on the line 4—4 of Fig. 3.
Figure 5:
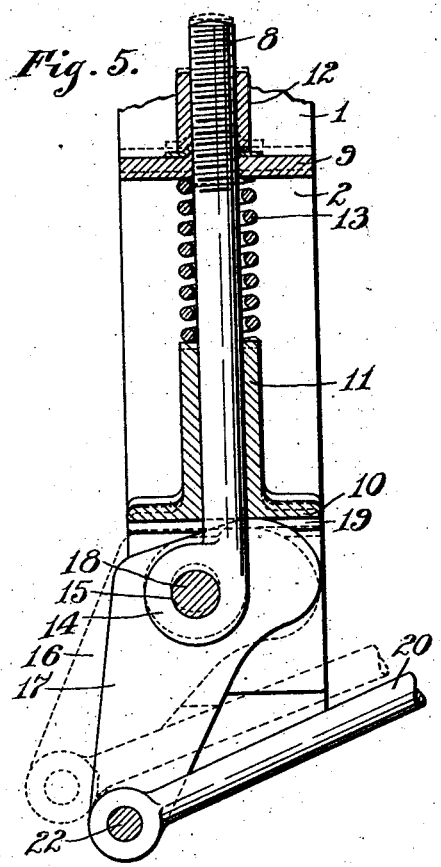
Fig. 5 is a detail section of the compressing bolt and its operating mechanism.

In the preferred embodiment of my invention the brake is adapted to be supported upon the rear end of the transmission housing and operated by a hand lever pivotally mounted on the transmission housing.

The brake comprises the usual metallic brake band 1 which, as is usual in brakes of this type, is provided with a friction lining 2. The back of the band is provided with a " U " shaped anchor clip 3, the free ends of which are adapted to be riveted to the band and which is adapted to receive the end 4 of a supporting bracket 5. This bracket is secured to the rear wall of the transmission housing by cap screws 6 and the bracket may be either formed of a casting or from a suitable stamping. By providing a supporting bracket of this character, I am enabled to manufacture the same cheaply as the casting or stamping may be relatively rough and the only finishing required is the finishing of the top and bottom of the end 4 where it fits in the anchor clip 3. An adjusting screw 7 passing through the anchor clip and having threaded engagement with the end 4 of the bracket serves as a means for adjusting the band relatively to the brake drum.

The free ends of the band are adapted to be contracted to set the brake by a compression bolt 8. To this end one free end of the band has riveted thereto a top lug or bracket 9 and the opposite free end has riveted thereto a second or bottom lug 10. This bottom lug 10 is preferably in the form of a casting or forging having an arm by which it is secured by rivets or otherwise, to the brake band and provided with a boss 11 having an opening through which the compression bolt passes. The upper end of the compression bolt extends through an opening in the top lug 9 and has its end threaded to receive an adjusting and stop nut 12 which bears on the lug. Interposed between the boss 11 and the top lug 9 is a coiled spring 13 which surrounds the compression bolt, being held in place thereby and tends to separate the ends of the brake band thereby causing the brake to release when the hand operated lever is released. The lower end of the bolt 8 extends beyond the lower end of the lug 10 and is provided with a head 14 offset from the center line and having a transverse opening 15 therein. The bolt 8 is operated to compress or contract the band by means of a cam member 16. This cam member comprises a pair of substantially bell crank arms 17, the shorter leg of which forms the operating cam. The two arms are preferably formed from stampings and are hung one on each side of the head 14, on a pivot pin 18 extending through the opening 15. The upper edges of the two plates operate in a milled slot 19 on the under surface of the bottom lug 10 and the lower ends of the long arms are connected by a link rod 20 with the hand lever 21. The rear end of this link rod is interposed between the two plates of the cam member and is connected thereto by a pin 22 passing through the plates and an opening in the rod. By forming the cam member in two plates as above described, I am enabled to get sufficient strength from simple stampings which, due to the fact that the metal is comparatively thin, will enable me to get a smoothly sheared cam surface.

As the pull on the cam member is transversely of the plane of the drum there is a tendency to pull the free ends of the band off the drum in applying the brake and to prevent this I provide a stop which preferably takes the form of a stamping 23, the rear end of which is secured to the transmission casing by one of the cap screws 24 which secures in position the brake sector of the hand lever. The lower edge of this bracket or stamping 23 is provided with an inturned lip 25 which engages under the brake sector and prevents the front end of the bracket from dropping. The front end of the bracket is provided with a guide lip 27 extending at right angles to the bracket and adapted to engage in a vertical slot 28 formed in the side of the boss 11. By this arrangement while the boss is permitted a free vertical movement during the operation of the brake, any transverse movement of the ends of the brake band is prevented. This bracket 23 is also provided with an upturned horizontally disposed lug 29 on which is adapted to rest the lower end of a set screw 30 passing through an ear 31 formed on the boss 11 and held in its adjusted position by a lock nut 32. This set screw supports the weight of the brake band when released and also provides a means for adjusting the brake band relatively to the drum and permits of an accurate and close adjustment for clearance between the brake band and the drum.

I claim as my invention:—

1. In an automobile brake, in combination, a brake band, an anchor clip secured to said band at a point substantially equidistant of its ends, a supporting bracket adapted to be secured to a supporting member and having an end engaging in said anchor clip for supporting the band, a compression bolt passing through openings in the ends of the band and connected to one of the ends thereof, a cam member secured to said bolt and engaging the other end of the band and a guide member having engagement with the band and preventing lateral displacement of the ends of the band while permitting the ends to move longitudinally.

2. In an automobile brake, in combination, a brake band, means for supporting the band at a point substantially equidistant of its ends, one of the ends of the band having an elongated guide bearing, a compression bolt connected to one end of the band and passing through said guide bearing, a cam member connected to said bolt and engaging the end of the band and a bracket having a sliding connection with the guide bearing which permits the end of the band to move in one plane but prevents displacement of the band in a transverse direction.

3. In an automobile brake, the combination, with a transmission case, of a brake lever pivoted on said case, a toothed sector bolted on said case for co-operation with a dog on said lever, a brake band at the end of said transmission casing, a bracket secured to said transmission casing and having an extension connected to the band at a point substantially equidistant of the ends of the band and supporting the band, a second bracket secured on said transmission casing by one of the bolts securing said toothed sector in position and arranged to engage the brake band to prevent transverse movement of said ends while permitting the same to move vertically.

4. In an automobile brake, in combination, a brake band having an anchor clip mounted thereon substantially equidistant of its ends, a supporting bracket for the band engaging said anchor clip, one of the ends of said band having an elongated boss thereon provided with a compression bolt opening and having on its side a vertically extending guide slot, a compression bolt secured to one of the ends of the band and passing through said boss, a cam operating member secured to said compression bolt and engaging the opposite end of the band and a bracket having a lip engaging said slot to prevent transverse displacement of the band while permitting vertical movement thereof.

5. In an automobile brake, in combination, a brake band, means for supporting said band at a point equidistant of its ends, one of the ends of said band having an extension provided with a vertically extending slot, a bracket having a lip engaging in said slot for preventing transverse displacement of said end and a set screw on said end arranged to engage a portion of said bracket to support said end and provide means for adjusting said band relatively to the brake drum.

6. In an automobile brake, in combination, a brake band, means for supporting the band at a point substantially equidistant of its ends, an extension ear secured to one of the ends of the band and having an opening therein, a second extension ear secured to the other end of the band and provided with an elongated boss, a compression bolt passing through an opening in said boss and the opening in the opposite extension ear, a nut on said bolt engaging said extension, a cam on the opposite end of the bolt arranged to engage the boss extension, a coil spring interposed between said boss and the opposite end ear and a bracket member having a lip engaging a vertically extending slot in said boss for preventing transverse displacement of the ends of the band when the cam is operated to contract said band.

7. In an automobile brake, in combination, a transmission casing, a hand lever mounted on said casing and a toothed sector mounted on one side of said casing for co-operation with the dog of the hand lever, a brake band, a bracket secured to the end of the transmission casing and connected to the anchor clip of the brake band for supporting said band, a second bracket mounted on one of the bolts of the toothed sector and having an ear engaging under said sector to hold said bracket in substantially a horizontal position, said bracket having at its free end an ear engaging a slotted member on the brake band to permit free expansion and contraction of the ends of the band and prevent transverse distortion of the band.

8. The combination with a transmission casing, of a supporting bracket secured to one end of the casing, a brake band having an anchor clip engaged by said supporting bracket and supporting the band, a compression bolt passing through openings in the ends of the band and adjustably connected to one end thereof, a rocking cam member secured to said bolt and engaging the other end of the band, a guide arm secured to the transmission frame and having engagement with the band and preventing lateral displacement of the band while permitting the ends to move longitudinally.

9. In an automobile brake, in combination, a brake band, means for supporting said band at a point equidistant of its ends, one of the ends of said band having an extension provided with a vertically extending slot and a bracket having a lip engaging in said slot for preventing transverse displacement of said end.

10. In an automobile brake, in combination, a transmision casing, a hand lever mounted on said casing and a toothed sector mounted on one side of said casing for cooperating with a dog of the hand lever, a brake band having an anchor clip, a bracket secured to the end of the transmission casing and connected to the anchor clip of the brake band for supporting said band, a second bracket secured on the side of the transmission casing and having an ear engaging under said sector to hold said bracket in substantially a horizontal position, said bracket having at its free end an ear engaging a slotted member on the brake band to permit free expansion and contraction of the ends of the band and prevent transverse distortion of the band.

In witness whereof, I SAMUEL O. WHITE have hereunto set my hand at Muncie, Indiana, this thirty-first day of July, A. D. one thousand nine hundred and twenty three.

SAMUEL O. WHITE.